US007521646B2

United States Patent
Schlafhauser et al.

(10) Patent No.: US 7,521,646 B2
(45) Date of Patent: Apr. 21, 2009

(54) COLLET AND NUT ASSEMBLY FOR STUD WELDER

(75) Inventors: Joe Schlafhauser, Troy, MI (US); Brian M. Wilkins, Macomb, MI (US); Mark Schweihofer, St. Clair, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/190,142

(22) Filed: Jul. 27, 2005

(65) Prior Publication Data
US 2006/0032837 A1 Feb. 16, 2006

Related U.S. Application Data

(60) Provisional application No. 60/600,372, filed on Aug. 11, 2004.

(51) Int. Cl.
*B23K 9/20* (2006.01)
(52) U.S. Cl. .......................................................... 219/98
(58) Field of Classification Search ................... 219/98, 219/99; 279/43.1, 43.2
See application file for complete search history.

(56) References Cited

U.S. PATENT DOCUMENTS

| 2,038,602 A | 4/1936 | Redinger | 279/32 |
| 2,549,804 A | 4/1951 | Graham | 219/4 |
| 3,293,402 A | 12/1966 | Graham | 219/98 |
| 3,352,996 A | 11/1967 | Neumeier | 219/98 |
| 3,854,027 A | 12/1974 | Ettinger et al. | 219/98 |
| 3,940,587 A | 2/1976 | Oehry | 219/98 |
| 4,027,136 A | 5/1977 | Taylor | 219/98 |
| 4,267,426 A * | 5/1981 | Mallett | 219/98 |
| 4,562,329 A | 12/1985 | Minton | 219/98 |
| 4,620,079 A | 10/1986 | Allmann et al. | 219/98 |
| 5,138,128 A | 8/1992 | Van Rhyn et al. | 219/98 |
| 6,015,962 A * | 1/2000 | Wiessler et al. | 219/98 |
| 6,838,634 B2 * | 1/2005 | Obermann | 219/98 |
| 2003/0217992 A1 | 11/2003 | Obermann | 219/98 |

FOREIGN PATENT DOCUMENTS

| DE | 39 30 320 | 3/1991 |
| GB | 2 130 133 | 5/1984 |
| JP | 3-114674 | 5/1991 |

* cited by examiner

*Primary Examiner*—Kevin P Kerns
(74) *Attorney, Agent, or Firm*—Stephen R. Valancius; Michael P. Leary

(57) ABSTRACT

A collet and nut assembly for a stud welder in which the body of a tubular nut has an extension sleeve that surrounds a tubular collet having longitudinal tangs separated by slots. Relief holes at base ends of the slots are inside the nut, and maximum stress on the collet is redistributed away from the relief holes. The nut may have a further tubular extension forming a cover for the collet, with a face that protects the tip of the collet from weld spatter and soot. The cover also protects the collet from heat.

4 Claims, 5 Drawing Sheets

COLLET AND NUT ASSEMBLY FOR STUD WELDER

CROSS REFERENCE TO RELATED APPLICATION

This application claims the benefit of provisional application 60/600,372 filed Aug. 11, 2004, incorporated herein by reference.

BACKGROUND OF THE INVENTION

This invention relates to collet and nut assemblies used in stud welders, and is more particularly concerned with reducing or eliminating the most commonly experienced failure modes associated with the collets.

A conventional stud welder uses a metal collet through which metal studs are advanced. As the stud advances in the collet, a leading stud flange forces a deflection in tangs of the collet, which flex to allow the flange to pass through. The force required to advance the flange of the stud through the collet is the feeding force. Once the flange passes through the collet, the tangs spring back, clamping down on the stud shank. After the stud has been welded to the workpiece, the shank can be pulled from the collet. The force required to pull the shank from the collet at this stage is the holding force.

U.S. Pat. No. 6,015,962 granted Jan. 18, 2000 (incorporated herein by reference) discloses a prior art collet used in a stud welder. The collet comprises, inter alia, a series of circumferentially spaced tangs separated by longitudinal slots, each of which has a relief hole at a root end remote from the tip end of the slot.

BRIEF DESCRIPTION OF THE INVENTION

A basic feature underlying the present invention is reduction of stress on collet tangs and relief holes by redistributing stress away from a natural area of stress concentration, greatly increasing collet life. An additional feature of the invention is a cover that protects the collet from weld spatter, soot, and heat, in severe environments. Both features can combine to eliminate the most commonly experienced failure modes associated with collets, namely, cracking/breaking tangs, weld spatter collecting in collet tangs, stud spit-out, and collets arcing to studs.

BRIEF DESCRIPTION OF THE DRAWINGS

The invention will be further described in conjunction with the accompanying drawings showing prior art and preferred (best mode) embodiments wherein.

DETAILED DESCRIPTION OF THE INVENTION

Figure 1:
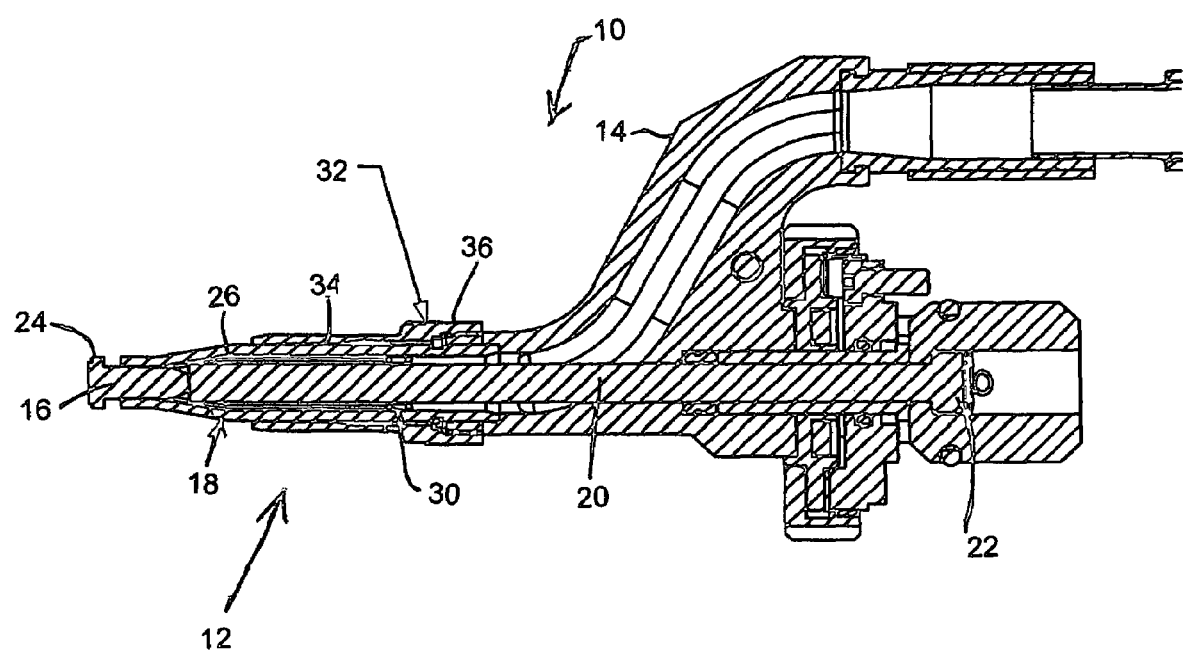
FIG. 1 is a longitudinal sectional view showing a first prior art collet and nut assembly.

Collet and nut assemblies in accordance with the invention will be described in conjunction with conventional stud welding apparatus shown in FIGS. 1 and 2, for example. Such stud welding apparatus 10 or 10' may comprise a welding head 12 or 12' having a tubular stud-loading component 14 or 14' through which studs 16 are pneumatically conveyed toward a tubular resiliently expandable collet 18, an example of which is described below. A loading pin 20 or 20' moved axially by a piston 22 or 22' advances a stud from the tubular stud-loading component 14 or 14' into the collet 18. The flange 24 of the stud is exposed for welding of the stud to a metal surface of a workpiece (not shown) using a current that flows between the stud and the workpiece.

Figure 5:
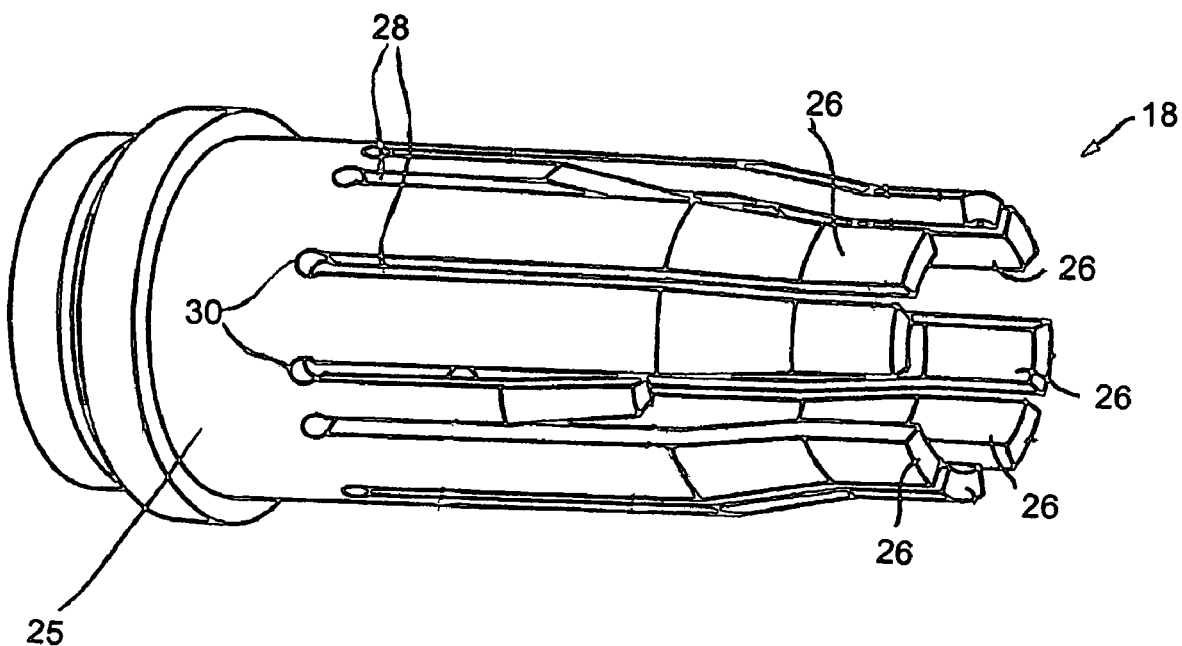
FIG. 5 is a perspective view of a prior art collet.

FIG. 5 shows a prior art collet 18 disclosed in the aforesaid U.S. Pat. No. 6,015,962 and comprising a base 25 from which extend a plurality of flexible longitudinal tangs 26 separated by slots 28, each having a relief hole 30 at a base end opposite to the tip of the collet. Incidentally, the shorter tangs shown in FIG. 5 relate to the invention of the aforesaid patent and are not of concern to the present invention.

FIG. 1 shows a metal tubular collet nut 32 of the prior art, with slot-separated tangs 34 that extend longitudinally from the body 36 of the nut. These collet nut tangs surround a collet flexibly, but are expensive and fragile and complicate the assembly that includes the collet 18 and the nut 32. Also, with such a nut the collet 18 has a short life span due to high stress on the relief hole 30 of each longitudinal slot separating adjacent tangs 26 of the collet. The relief holes 30 of the slots separating adjacent collet tangs 26 are located in a transverse plane close to the plane from which the tangs extend longitudinally from the main nut body 36.

Figure 2:
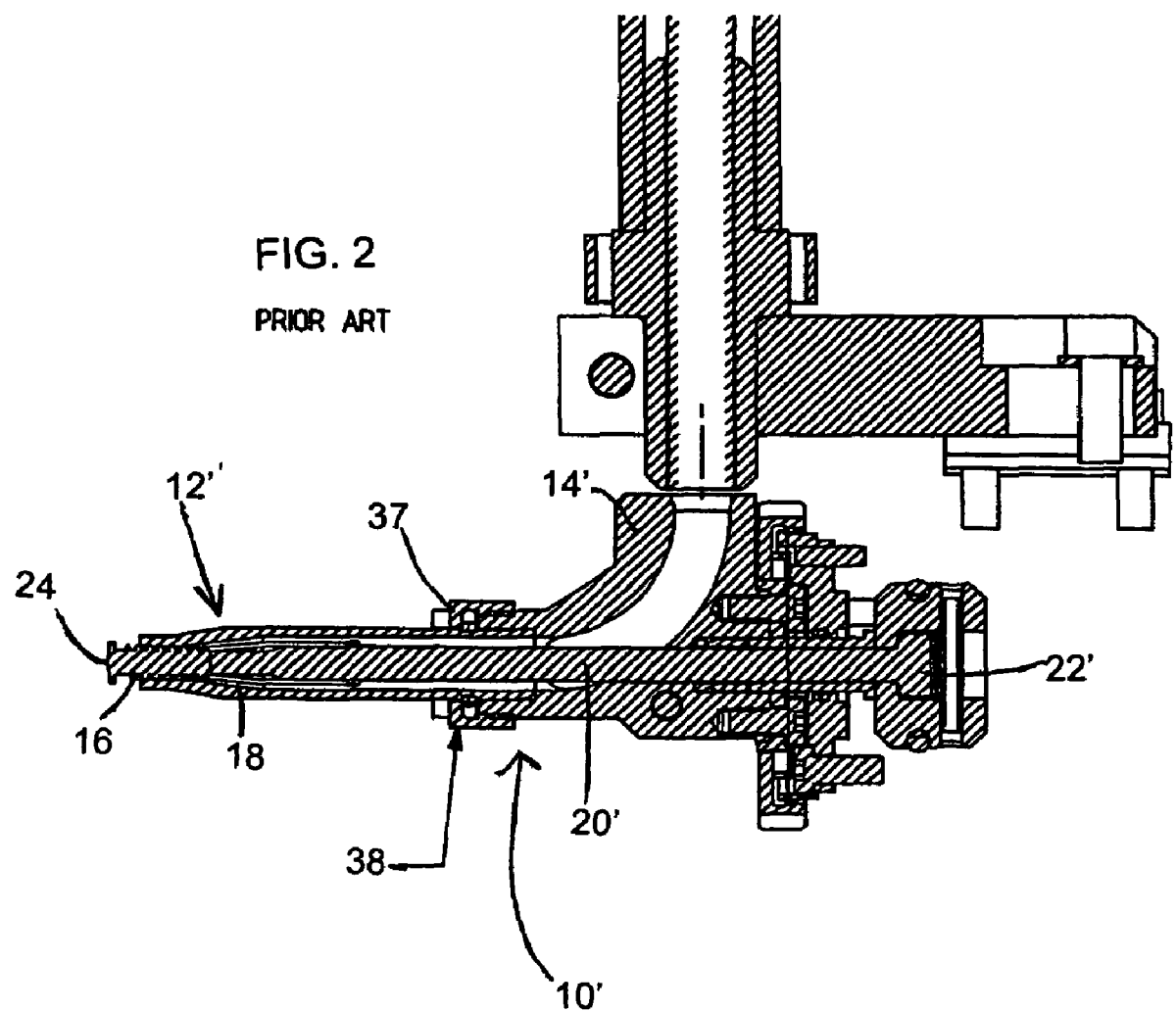
FIG. 2 is a longitudinal sectional view showing a second prior art collet and nut assembly.

FIG. 2 shows another metal tubular collet nut 38 of the prior art without the longitudinal extension 34 of the collet nut 32 in FIG. 1. The only function of the nut 38 is to retain the collet 18. Maximum stress on the collet is concentrated at the tip end 37 of the nut. Here too, concentrated stress reduces the life of the collet.

Figure 3:
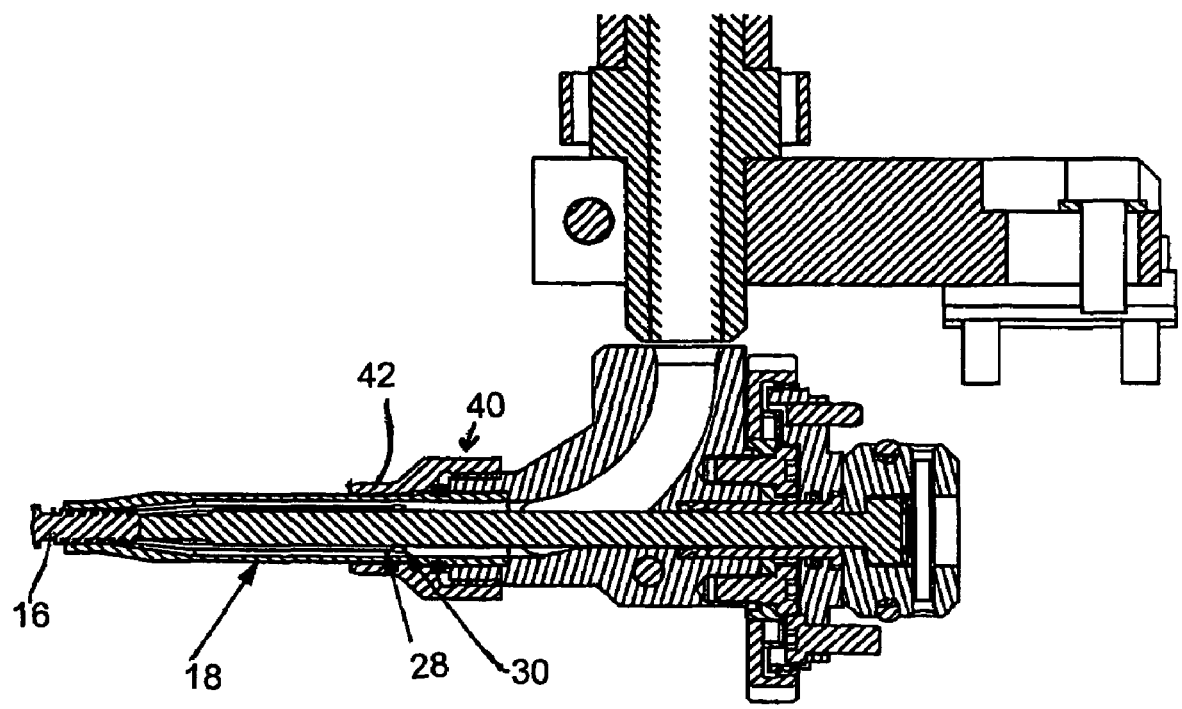
FIG. 3 is a longitudinal sectional view showing a collet and nut assembly of the invention in a first embodiment.

In accordance with a first embodiment of the invention, FIG. 3 shows a collet and nut assembly in which the body of a metal tubular collet nut 40 has a short tubular longitudinal extension sleeve 42 without tangs or slots, i.e., the walls of the nut body and the sleeve are continuous and undivided. The sleeve 42 moves the location of maximum stress toward the tip of the collet and places the relief holes 30 of the collet inside the nut. This feature redistributes stress away from the relief holes 30 of the collet, greatly increasing collet life.

Figure 4:
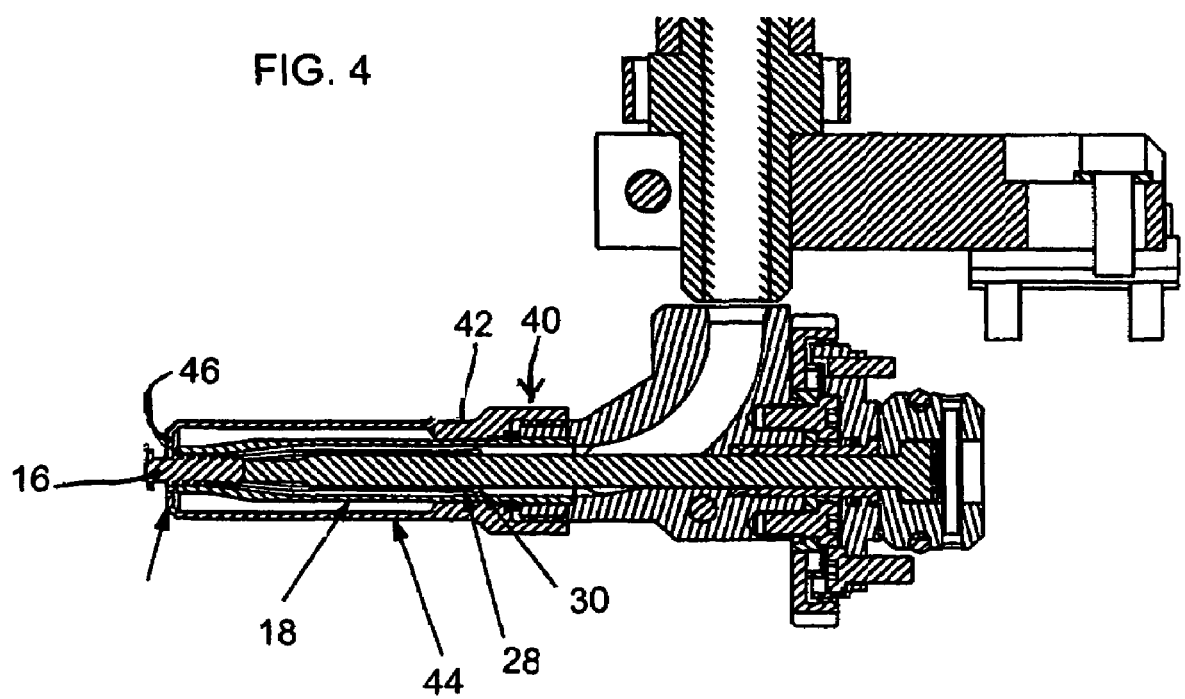
FIG. 4 is a longitudinal sectional view showing a collet and nut assembly of the invention in a second embodiment.

FIG. 4 shows another feature added to the FIG. 3 embodiment, namely, a further tubular extension sleeve of the nut, that extends longitudinally toward the tip of the collet as a cover 44 that protects the collet from weld spatter and soot and that dissipates heat. The cover 44 has a protective front face 46 with a hole through which the stud passes. The protective front face prevents weld spatter from adhering to the collet and reduces the possibility of weld spatter welding collet tangs together. It also protects the collet from soot and dissipates heat, further increasing the life of the collet.

The attributes of the invention are achieved without requiring undersirable modification of the welder. While preferred embodiments of the invention have been shown and described, changes can be made without departing from the principles and the spirit of the invention, the scope of which is defined in the following claims.

What is claimed is:

1. A collet and nut assembly for a stud welder comprising:
    a tubular collet having a base for support on the stud welder and having a plurality of flexible tangs extending longitudinally from the base to a tip of the collet and separated by slots with relief holes at the base; and
    a tubular nut surrounding the collet and having a body for support on the stud welder and a sleeve extending longitudinally from the body toward the tip of the collet, the sleeve being devoid of tangs and slots, the body and sleeve of the nut being constituted entirely by walls that are continuous and undivided, wherein the relief holes of the collet are located radially and axially inside the nut.

2. A collet and nut assembly according to claim 1, wherein a tubular cover extends longitudinally from the nut sleeve and has a face adjacent to the tip of the collet with a hole therein for passing a stud, whereby the collet is protected from weld spatter.

3. A collet and nut assembly for a stud welder comprising:

a tubular collet having a base for support on the stud welder and having a plurality of flexible tangs extending longitudinally from the base to a tip of the collet and separated by slots with relief holes at the base; and a tubular nut surrounding the collet and having a body for support on the stud welder and a sleeve extending longitudinally from the body toward the tip of the collet, wherein the relief holes are located axially and radially inside the nut such that, when a flange of a stud is advanced through the tubular collet and places an expansion force on the flexible tangs of the tubular collet, the nut serves to place maximum stress on the flexible tangs of the tubular collet at a location shifted away from the relief holes in a direction toward the tip of the collet.

4. A collet and nut assembly according to claim 3, wherein a tubular cover extends longitudinally from the nut sleeve and has a face adjacent to the tip of the collet with a hole therein for passing a stud.

* * * * *